UNITED STATES PATENT OFFICE.

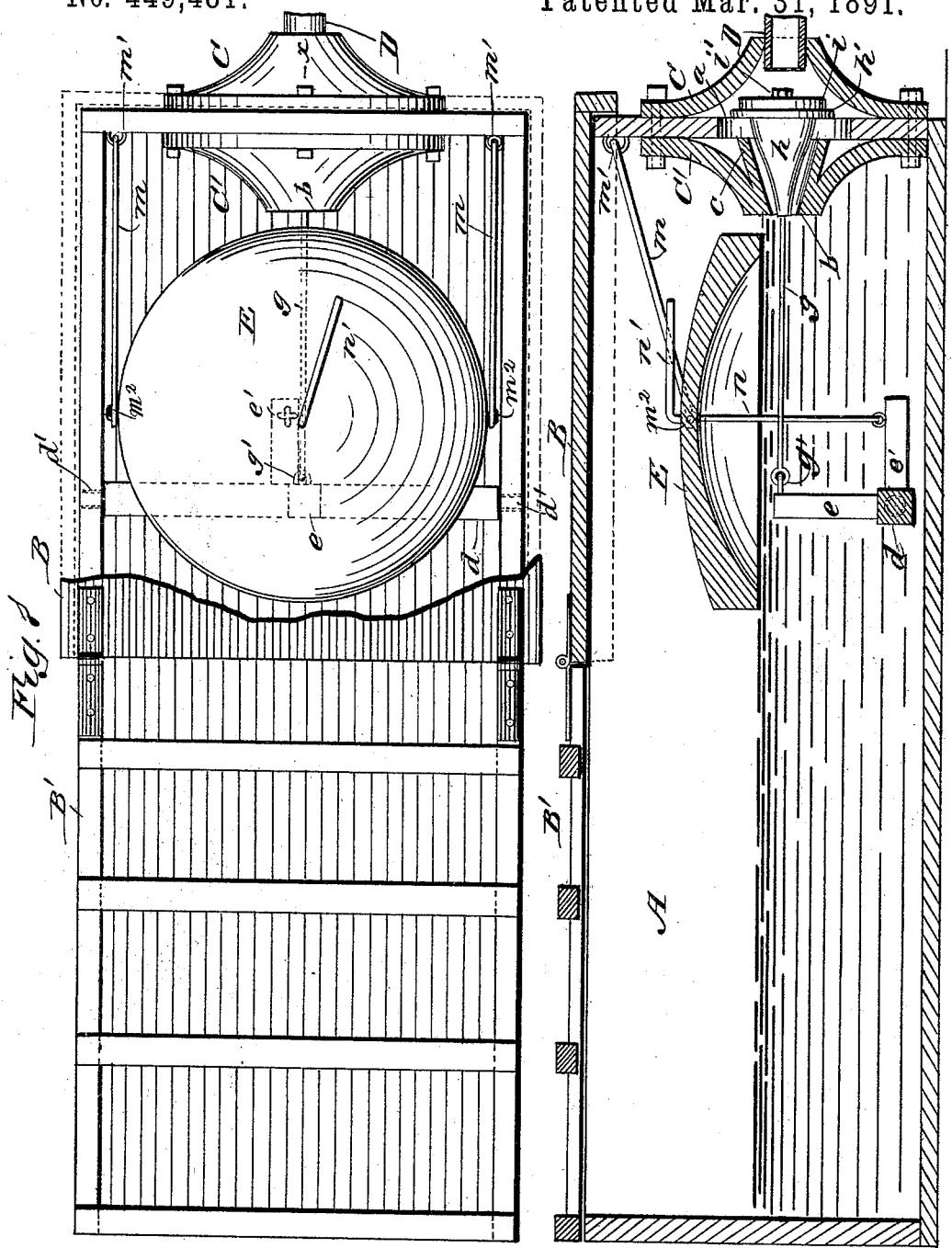

BERNHARD KOEPPE, OF KEARNEY, NEBRASKA.

WATER-TROUGH.

SPECIFICATION forming part of Letters Patent No. 449,481, dated March 31, 1891.

Application filed December 19, 1890. Serial No. 375,176. (No model.)

*To all whom it may concern:*

Be it known that I, BERNHARD KOEPPE, of Kearney, in the county of Buffalo and State of Nebraska, have invented a new and useful Improvement in Water-Troughs, of which the following is a full, clear, and exact description.

This invention relates to improvements in troughs for the watering of stock and fowls, and has for its objects to provide a simple and efficient device of the character named, which will, if connected to a proper water-supply, afford means to control the inflow of water to the trough, so that a desired height of said liquid will be uniformly maintained by the automatic action of the controlling mechanism in the trough and attached thereto.

To these ends my invention consists in the construction and combination of parts, as is hereinafter described and claimed.

Reference is to be had to the accompanying drawings, forming a part of this specification, in which similar letters of reference indicate corresponding parts in both the figures.

Figure 1 is a plan view of the water-trough with its top broken, and Fig. 2 is a side elevation in section taken on the line $x\ x$ in Fig. 1.

The trough A consists of a preferably rectangular structure of wooden planks having a fixed cover B extended over a portion of its length, and a slatted cover B′, hinged to said cover B and adapted to protect the remaining portion of the top of the trough, the close cover B serving to prevent the animals from interfering with parts in the trough, while the slatted part B′ permits the stock to drink, but restrains an unruly animal from entering the trough or obstructing other beasts from partaking of the water.

At one end of the trough A an inlet-aperture $a$ for the introduction of water is formed, preferably circular, and of a suitable diameter.

Two dished plates C C′ of the same exterior diameter are provided, which are bolted upon the outer and inner surfaces of the end wall of the trough A over the aperture $a$, forming a water-tight joint at the points of contact with said wall. The exterior dished plate C is perforated centrally for the reception of a water-supply pipe D, that is fitted tightly therein. Said pipe (shown broken) is extended to any adequate source of fresh-water supply, which may be a spring that is elevated above the trough or a tank wherein water flows or is pumped. (Not shown.) The plate C′, which is placed in the trough A directly opposite the plate C, is also perforated at the apex at $b$, and is furnished with a concentric conical flange $c$, inwardly extending from its inner surface, thus affording a valve-seat that is flaring toward the end of the water-supply pipe D. At a proper distance from the inner plate C′, within the trough A, a transverse rock-shaft $d$ is journaled by its ends $d'$ engaging with opposite perforations formed in the side walls of the trough near the bottom.

Near the center of the trough, transversely considered, two arms $e\ e'$ are affixed to the rock-shaft $d$, the first-named in a nearly-vertical plane and the other projecting toward the plate C′ at a right angle to the arm $e$, thus converting the rock-shaft into a bell-crank. Near the upper terminal of the bell-crank arm $e$ the link-bar $g$ is loosely connected thereto by an eyebolt $g'$ or other equivalent means, the opposite end portion of the link-bar being axially secured to the small end of a conical valve $h$, that extends within the flange $c$, and has a leather or gum packing $h'$ held on its larger end by a clamping-plate $i$ and bolt $i'$, said parts being so relatively proportioned that the packing $h'$ will engage the inner edge or face of the conically-flared flange $c$ and seal the opening therethrough and in the plate C′, whereon it is formed when the valve $h$ is forced toward the plate C′.

A dished float E, preferably made of wood, is placed in the trough A, and is there held with its concave side below and adapted to float upon the water, when it is introduced within the trough, by the connecting-rods $m$, which are jointed to the end wall of the trough, as at $m'$, and the float at $m^2$. A pusher-bar $n$, having bent handle $n'$, and inserted through a perforation in the float E and joined thereto extends downwardly a proper distance to have a jointed connection with the bell-crank arm $e'$ near its outer end, thus furnishing means to rock said arm upwardly and close the valve $h$ by lifting the handle $n'$ or by depressing said handle to open the valve and admit water.

In service, there being proper connections for a water-supply, which may be at a point remote from the trough A, if there is no water in trough, the valve $h$ will be held open by the gravity of the float E, and when the water has flowed into the trough until there is a sufficient height in it for the watering of cattle or other live stock as well as fowls, the elevation of the float E to a predetermined height will rock the arm $e'$ upwardly and the arm $e$ rearwardly, thereby closing the valve $h$ automatically, the valve remaining closed until there is sufficient water removed from the trough to lower the arm $e$ and vibrate the other arm toward the plate C', and thus open the valve for a renewal of water-supply.

Having thus described my invention, I claim as new and desire to secure by Letters Patent—

1. The combination, with a water-trough apertured in its end wall and a water-supply pipe supported in a dished plate opposite the trough aperture, of an apertured plate having a valve-seat secured opposite the aperture of the trough within, a valve, a float, and mechanism which connects the valve and float, substantially as shown and described.

2. The combination, with a water-trough having an aperture, a centrally-perforated dished plate over the trough aperture, and a pipe for water-supply in said plate, of an aligning apertured dished plate having a flaring valve-seat on it, a valve which may engage the valve-seat, a float within the trough, which will be moved vertically by fluctuations of water-level in the trough, and a device which connects the float with the valve and is adapted to close the valve when water is at a maximum height in the trough, substantially as set forth.

3. The combination, with a water-trough apertured at one end, a slatted cover therefor, a dished and apertured plate which is secured over the inlet aperture in the trough, and an aligning dished and centrally-apertured plate within the trough, having a conical valve-seat projecting toward the trough aperture, of a valve which controls the passage for water into the trough, a float within the trough, rods that connect the float and trough, a transverse rock-shaft below the float, having two bell-crank arms, and bars that connect the float with the horizontal bell-crank arm and the upright bell-crank arm with the valve, substantially as set forth.

BERNHARD KOEPPE.

Witnesses:
 WM. R. LEARN,
 J. N. WHITE,
 LELAND EVERETT.